United States Patent [19]

Bodin et al.

[11] Patent Number: 5,542,093

[45] Date of Patent: Jul. 30, 1996

[54] METHOD FOR REDISTRIBUTING DUAL MODE MOBILE UNITS TO EXTENDED CHANNEL GROUPS TO REDUCE CONGESTION IN PRIMARY CHANNEL GROUPS

[75] Inventors: Stig R. Bodin, Spanga; Lotta Voigt, Stockholm; Per-Ola Gaasvik, Jarfalla, all of Sweden

[73] Assignee: Telefonaktiebolaget LM Ericsson, Stockholm, Sweden

[21] Appl. No.: 393,046

[22] Filed: Feb. 23, 1995

Related U.S. Application Data

[63] Continuation of Ser. No. 928,056, Aug. 11, 1992, abandoned.

[51] Int. Cl.$^6$ .......................................... H04Q 7/22
[52] U.S. Cl. .................. 455/33.2; 455/34.1; 455/54.1; 379/60
[58] Field of Search ................... 455/33.1, 33.2, 455/34.1, 54.1, 54.2, 56.1, 62, 67.1; 379/59, 60

[56] References Cited

U.S. PATENT DOCUMENTS

| | | | |
|---|---|---|---|
| 4,485,486 | 11/1984 | Webb et al. | 455/62 |
| 4,551,852 | 11/1985 | Grauel et al. | 455/33.1 |
| 4,573,206 | 2/1986 | Grauel et al. | 455/33.1 |
| 4,633,460 | 12/1986 | Suzuki et al. | 370/58 |
| 4,670,899 | 6/1987 | Brody et al. | 379/60 |
| 4,750,198 | 6/1988 | Harper | 455/33.1 |
| 4,794,635 | 12/1988 | Hess | 455/34.1 |
| 4,811,337 | 3/1989 | Hart | 370/85 |
| 4,831,373 | 5/1989 | Hess | 455/33.1 |
| 4,882,766 | 11/1989 | Akaiwa | 455/58 |
| 4,914,651 | 4/1990 | Lusignan | 455/33.1 |
| 4,972,455 | 11/1990 | Phillips et al. | 379/59 |
| 5,042,082 | 8/1991 | Dahlin | 455/33.2 |
| 5,119,397 | 6/1992 | Dahlin et al. | 455/33.1 |
| 5,203,011 | 4/1993 | Bane et al. | 455/34.1 |
| 5,203,012 | 4/1993 | Patsiokas et al. | 455/34.1 |
| 5,218,630 | 6/1993 | Patsiokas et al. | 455/34.1 |
| 5,239,676 | 8/1993 | Strawczynski et al. | 455/33.2 |
| 5,343,513 | 8/1994 | Kay et al. | 455/34.1 |

FOREIGN PATENT DOCUMENTS

WO90/13187  11/1990  WIPO.

OTHER PUBLICATIONS

CTZ CAI, Version 1.1, dated Jun. 30, 1991, pp. 30 & 40, Sections 4.10.1 and 5.4.5.

*Primary Examiner*—Reinhard J. Eisenzopf
*Assistant Examiner*—Thanh Le
*Attorney, Agent, or Firm*—Burns, Doane, Swecker & Mathis, L.L.P.

[57] ABSTRACT

A method of setting up and handing off calls in a mobile cellular radio system in which consideration is given to the load capacity of several types of channels. The communication system determines the available capacity of the different groups of channels in the communication system whenever a new call needs to be set up. The system then assigns the new call to the group of channels with the most available channels if the requesting mobile station is a multi-mode mobile station, or the system hands off a multi-mode mobile station from a first group of channels to a second group of channels or vice versa to create free channels for calls from single mode mobiles.

10 Claims, 5 Drawing Sheets

5,542,093

METHOD FOR REDISTRIBUTING DUAL MODE MOBILE UNITS TO EXTENDED CHANNEL GROUPS TO REDUCE CONGESTION IN PRIMARY CHANNEL GROUPS

This application is a continuation of application Ser. No. 07/928,056, filed Aug. 11, 1992, is now abandoned.

FIELD OF THE INVENTION

The present invention relates generally to cellular mobile radio systems having channels for transmitting information between base stations and mobile stations. More precisely, the present invention relates to a method of setting up calls and a method of handing off calls whereby consideration is given to the load capacity of several types of channels.

BACKGROUND OF THE INVENTION

In cellular mobile radio systems, it is fundamental that a mobile station with an established connection on a radio channel shall be able to maintain the established connection when moving from one cell serviced by a base station to another cell serviced by another base station. It is also highly desirable that the mobile station with an established connection on a radio channel shall be able to maintain the established connection when moving within the same cell or when the radio channel which is used is subject to increased interference. The process by which a mobile station can maintain an established connection when moving in a cellular mobile radio system is generally called a handoff.

In general, radio communication is only possible when the desired information carrying radio signals have sufficient signal strength at the receiver and are sufficiently strong relative to the noise and interfering radio signals at the receiver. The minimum strength, of course, depends on the particular features of the system, e.g., the kind of modulation and the type of receiver. In order to insure that the established connection may continue on an intended radio channel between a mobile station and an intended base station, the handoff procedure includes measurements of the parameters of the radio signals at the intended base station and/or at the mobile station.

The first cellular mobile radio systems placed in public use were analog systems typically used for speech or other types of analog information. These systems include multiple radio channels for transmitting analog information between bases and mobile stations by transmitting analog modulated radio signals. In general, the first cellular mobile radio systems had relatively large cells, and the signal measurements in the handoff process in such systems were performed by the base station. One such system is the Nordic Mobile Telephone System NMT-450. Another known cellular mobile radio system is the AMPS Mobile Radio System in the United States. The general description of a mobile cellular radio system can be found in a publication entitled "CMS 88 Cellular Mobile Telephone System" published by Ericsson Telecom AB, 1988.

Currently, channel access is achieved using Frequency Division Multiple Access (FDMA) and Time Division Multiple Access (TDMA) methods. As illustrated in FIG. 1(a), in FDMA, a communication channel is a single radio frequency band into which a signal's (S1, S2) transmission power is concentrated. Interference with adjacent channels is limited by the use of band pass filters which only pass signal energy within the specified frequency band. Thus, with each channel being assigned a different frequency, system capacity is limited by the available frequencies as well as by limitations imposed by channel reuse.

In TDMA systems, as illustrated in FIG. 1(b), a channel consists of a time slot in a periodic train of time intervals over the same frequency. Each period of time slots is called a frame. A given signal's (S1, S2, S3, S4, S5) energy is confined to one of these time slots. Adjacent channel interference is limited by the use of a time gate or other synchronization element that possess signal energy received at the proper time. Thus, the problem of interference from different relative signal strength levels is reduced.

Capacity in a TDMA system is increased by compressing the transmission signal into a shorter time slot. As a result, the information must be transmitted at a correspondingly faster burst rate which increases the amount of occupied spectrum proportionally.

With FDMA or TDMA systems or hybrid FDMA/TDMA systems, the goal is to insure that two potentially interfering signals do not occupy the same frequency at the same time.

In contrast, Code Division Multiple Access (CDMA) allows signals to overlap in both time and frequency, as illustrated in FIG. 1(c). Thus, all CDMA signals share the same frequency spectrum. In either the frequency or the time domain, the multiple access signals (S1, S2, S3, S4) appear to be on top of each other. In principle, the informational data stream to be transmitted is impressed upon a much higher bit-rate data stream generated by a pseudo-random code generator. The informational data stream and the high bit-rate data stream are combined by multiplying the two bit streams together. This combination of the higher bit-rate signal with the lower bit-rate data stream is called coding or spreading the informational data stream signal. Each informational data stream or channel is allocated a unique spreading code. A plurality of coded information signals are transmitted on radio frequency carrier waves and jointly received as a composite signal at a receiver. Each of the coded signals overlaps all of the other coded signals, as well as noise related signals, in both frequency and time. By correlating the composite signal with one of the unique codes, the corresponding information signal is isolated and decoded.

In an attempt to give cellular systems more capacity, voice channels may be added to a cell in the existing radio frequency band (primary frequency band) or added to the cell in a new radio frequency band (extended frequency band). In the EIA/TIA IS-54 standard, the extended frequency band may be located at frequencies located above and/or below the frequencies contained in the primary frequency band. In one embodiment of the present invention, one or more of the base stations in the communication system may contain channels in both the primary frequency band and the extended frequency band.

In some cellular mobile systems, several different groups of channels are simultaneously available. As a result, there are three kinds of mobile stations which may be operating in the communication system. The first kind of mobile station is capable of using only a first group of channels. A second kind of mobile station is capable of using only a second group of channels. A third kind of mobile station is capable of using either the first or second group of channels.

SUMMARY OF THE INVENTION

The present invention overcomes the shortcomings of the prior art by dynamically setting up calls and/or changing the channel allocation of multi-mode cellular mobile stations using handoff to balance the Grade of Service (G.O.S.) which is also called the blocking rate experienced by the different mobile stations. The present invention determines the capacity of at least two types of channels whenever a new call has to be set up. If there is a shortage of channels, the system then allocates the new call to the type of channel in lesser demand if the new call is for a multi-mode mobile, or it hands off multi-mode mobile stations from a first group of channels to a second group of channels or vice-versa to create free channels for calls from single mode mobiles of the type for which there is a shortage of channels.

BRIEF DESCRIPTION OF THE DRAWINGS

The features and advantages of the invention will become apparent from reading the following detailed description in conjunction with the drawings, in which.

DETAILED DESCRIPTION

Figure 1A:
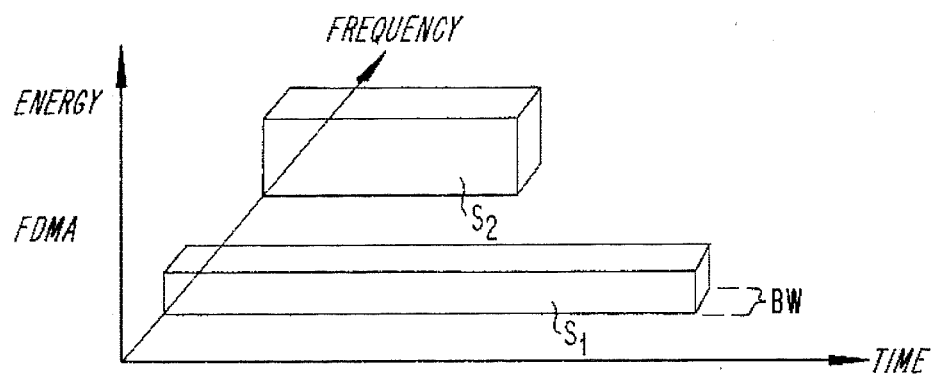
FIGS. 1(a)–1(c) are plots of channels using different multiple access techniques.
Figure 1B:
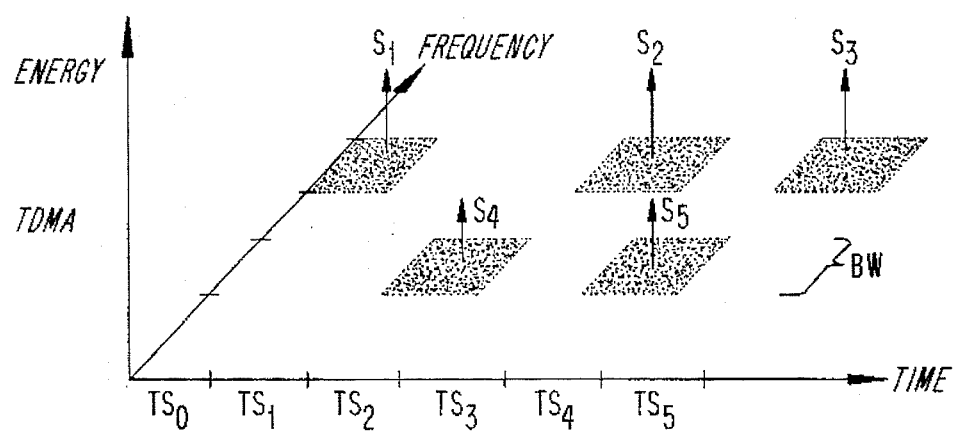
Figure 1C:
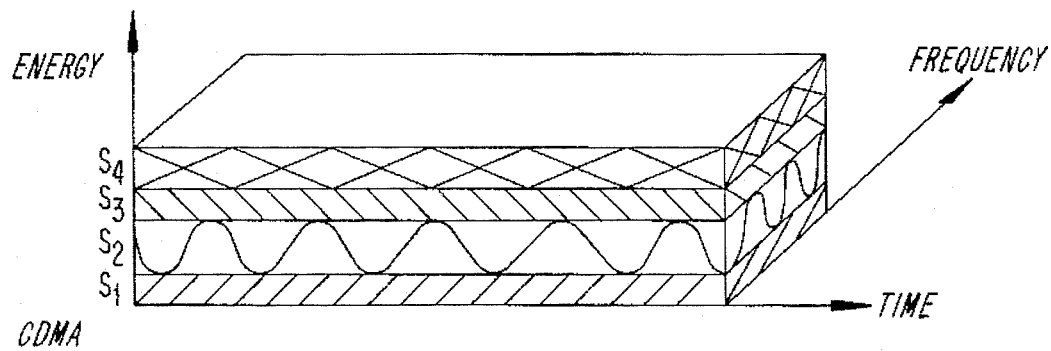
Figure 2:
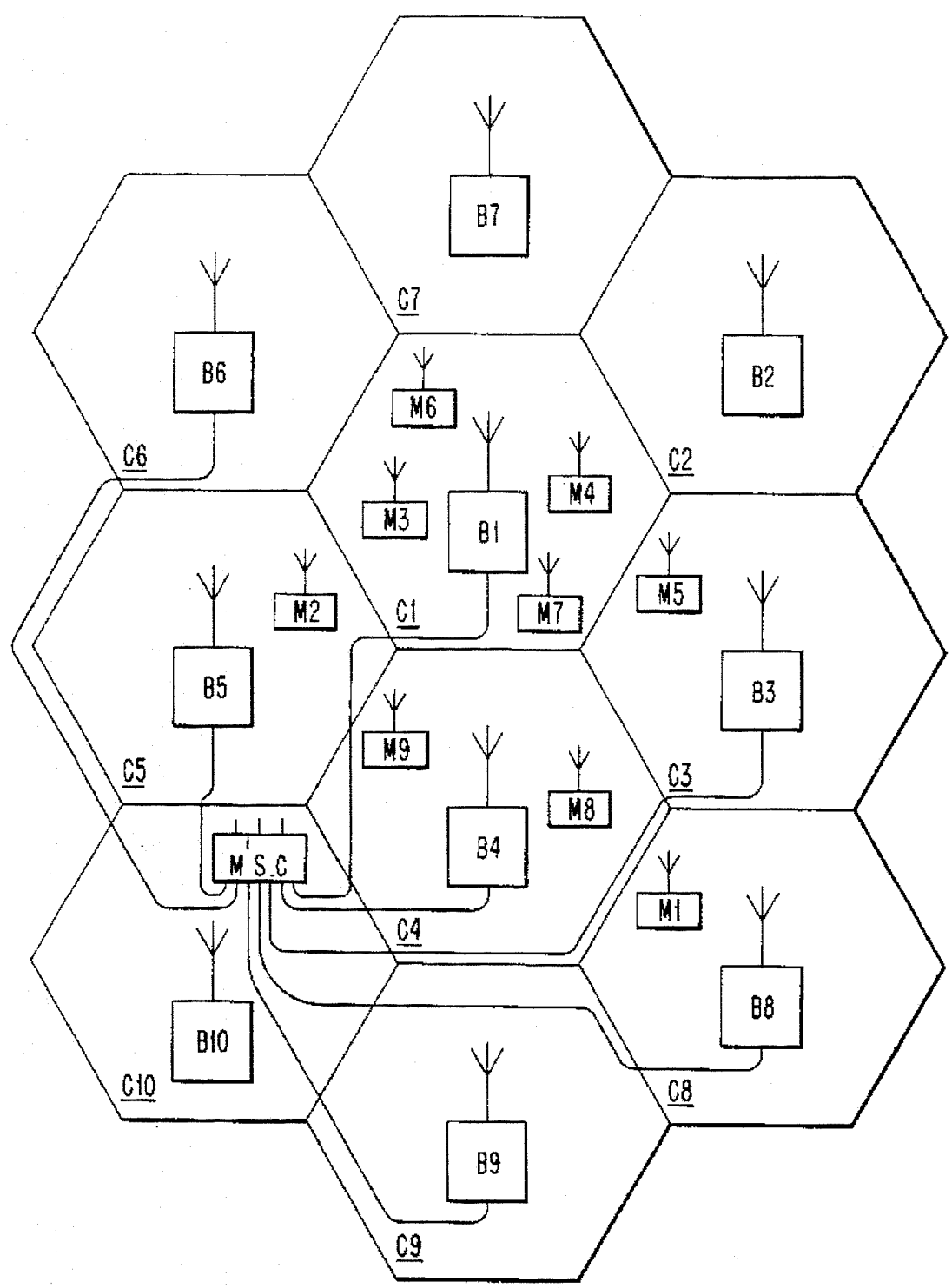
FIG. 2 illustrates a portion of a cellular mobile radio system having cells, a mobile switching center, base stations and mobile stations.

FIG. 2 illustrates ten cells, C1–C10, in a cellular mobile radio system. Normally a cellular mobile radio system according to the present invention would be implemented with more than ten cells. However, for the purposes of simplicity, the present invention can be explained using the simplified representation illustrated in FIG. 2. For each cell, C1–C10, there is a base station, B1–B10, with the same reference number as the corresponding cell. FIG. 2 illustrates the base stations as situated in the vicinity of the cell center and having omnidirectional antenna. The cells, C1–C10, are, therefore, schematically represented as hexagons. The base station of adjacent cells may, however, be co-located in the vicinity of cell borders and have directional antennas as is well known to those skilled in the art.

FIG. 2 also illustrates nine mobile stations, M1–M9, movable within each cell and from one cell to another. In a typical cellular radio system, there would normally be more than nine cellular mobile stations. In fact, there are typically many times the number of mobile stations as there are base stations. However, for the purpose of explaining the invention, the reduced number of mobile stations is sufficient.

Also illustrated in FIG. 2 is a mobile services switching center MSC. The mobile services switching center MSC illustrated in FIG. 2 is connected to all ten base stations, B1–B10, by cables. The mobile services switching center MSC is also connected by cables to a fixed public switching telephone network or a similar fixed network. All cables of the mobile services switching center MSC to be base station B1–B10 and cables to the fixed network are not illustrated.

In addition to the mobile services switching center MSC illustrated, there may be another mobile services switching center MSC connected by cables to base stations other than those illustrated in FIG. 2. Instead of cables, other means, for example, fixed radio links may be used for connecting base stations B1–B10, to the mobile services switching center MSC. The mobile services switching center MSC, the base stations B1–B10, and the mobile switching stations M1–M9, are all computer controlled.

The cellular mobile radio system illustrated in FIG. 2 includes a plurality of radio channels for communication. In all of the embodiments of the present invention, the cellular mobile radio system contains at least two types of radio channels. In one embodiment of the present invention, the communication system contains both analog and digital (TDMA or CDMA) radio channels which are simultaneously available. In another embodiment of the present invention, the communication system can have channels in a primary frequency band and additional channels in an extended frequency band. The extended frequency band can be located at frequencies above and/or below the frequencies of the primary frequency band. In another embodiment of the present invention, the communications system may simultaneously provide groups of TDMA channels and groups of CDMA channels.

In one embodiment of the present invention, when an analog mobile station accesses the cellular mobile system, the analog mobile station is assigned an analog channel. Likewise, a digital mobile station is assigned a digital channel when the digital mobile station accesses the communication system. However, when a multi-mode mobile station accesses the mobile system, the multi-mode mobile station is not automatically assigned to either an analog or digital channel. The communication system first determines the relationship between available analog and digital channels. As a result, the system will assign the multi-mode mobile station to an analog channel or a digital channel depending upon which group of channels has more available channels. However, this selection of channels may be limited to the case when the number of available channels in either group is below a predefined threshold.

Figure 3:
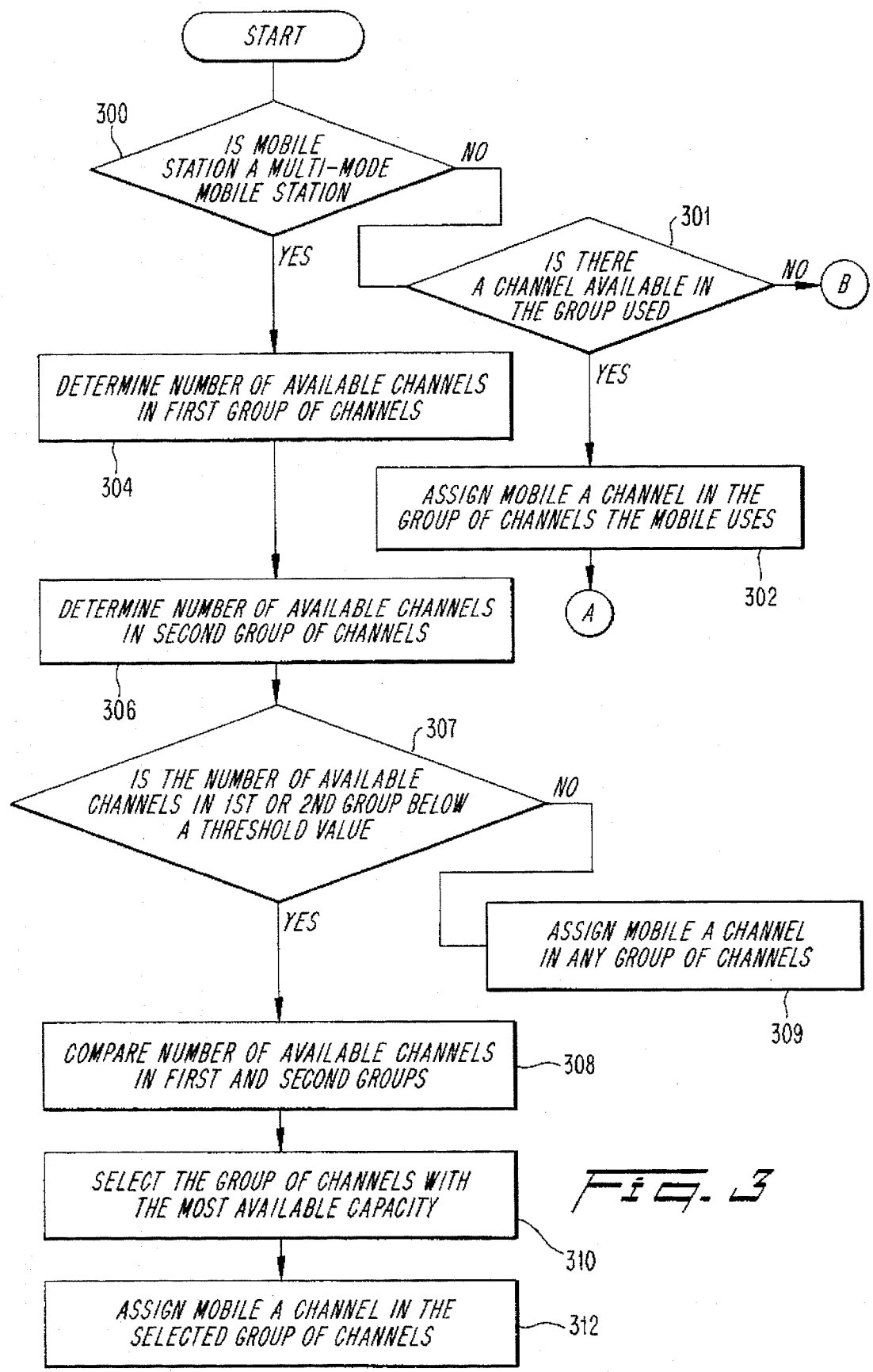
FIG. 3 illustrates a flow chart of a subroutine of an initial call set-up utilized by a computer in accordance with one embodiment of the present invention.

Referring to FIG. 3, there is shown a flow diagram illustrating the steps executed by the communication system to implement an initial call set-up in one embodiment of the present invention. The system first determines whether the requesting or requested mobile station is a multi-mode mobile station in step 300. If the mobile station is not a multi-mode mobile station, the system determines whether there is an available channel in the group of channels the mobile station uses in step 301. If a channel is available, the mobile station, in step 302, is assigned to an available channel in the mode of the mobile, otherwise the flow continues in FIG. 5. However, if the mobile station is a multi-mode mobile station, the system determines the available capacity of a first group of channels in step 304. In step 306, the system determines the available capacity of a second group of channels. The system then determines whether the number of available channels in either group is below a threshold value, for example, three available channels, in step 307. If the number of available channels in both groups exceeds the threshold value, the mobile station is assigned to a channel in either group of channels in step 309. However, if the number of available channels in either group of channels is below the threshold value, the system then compares the available capacity of the first group of channels with the available capacity of the second group of channels, in step 308, to determine which group of channels has the most available capacity. The multi-mode mobile station is then assigned to a channel from the group of channels with the most available capacity in steps 310 and 312. The threshold value can be set at various levels depending upon the desired characteristics of the communication system. In this embodiment, the threshold value is three available channels. In all embodiments of the present invention, the channel can be selected from the selected group either at random or by selecting the channel which has the least amount of interference.

Figure 4:
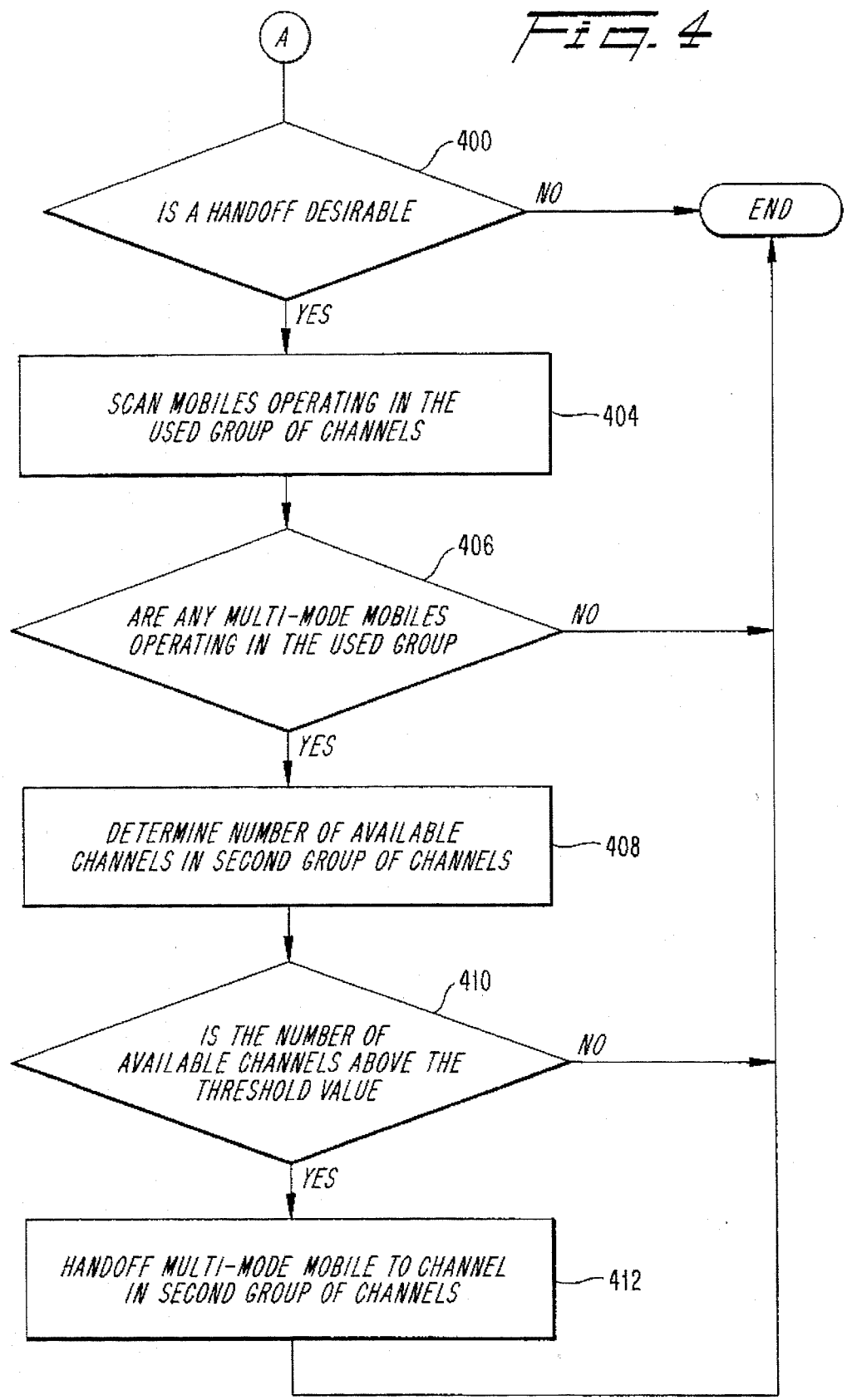
FIGS. 4 and 5 illustrate a flow chart of subroutines for handoff utilized by a computer in accordance with the present invention.

Referring now to FIG. 4, there is shown a flow diagram illustrating the steps executed by the communication system to implement the continuation of the flow diagram of FIG. 3 after step 302. The system first determines whether a handoff is desirable in step 400. In this embodiment, a handoff is desirable when a call setup for a single mode mobile station has been made and the number of available channels left in the group of requested channels are below a threshold value. The threshold value can be set at various levels depending upon the desired characteristics of the communication system. In this embodiment, the threshold value is three available channels. If a handoff is not desirable, i.e., the number of available channels of the requested type is above the threshold value, no further action is taken.

However, if it is determined in step 400 that a handoff is desirable, the system scans the mobile stations in the group of used channels in step 404 to determine if there are any multi-mode mobile stations presently operating in the used group of channels. If the system determines in step 406 that a multi-mode mobile station is not operating in the requested group of channels, no further action is taken. If the system determines in step 406 that a multi-mode mobile station is operating in the used group of channels the system determines whether the number of available channels of the second group of channels is above the threshold value in step 408. If it is determined in step 410 that the number of available channels in the second group of channels is not above the threshold value, a handoff is not made. However, if the number of available channels is above the threshold value, the multi-mode mobile station is handed off in a conventional manner to an available channel in the second group of channels in step 412.

An example of the above embodiment is described hereinafter. In this example, a base station contains both analog and digital channels. If a digital mobile station has been setup on a digital channel, the system first determines whether the number of available digital channels is still above the threshold value. If the number of available digital channels is below the threshold value, the system scans the mobile stations presently operating on the digital channels to determine if a multi-mode mobile station is operating on a digital channel. If a multi-mode mobile station is detected, the system determines whether the number of available analog channels is above the threshold value. If the number of available analog channels is above the threshold value, the multi-mode mobile station is handed off from a digital channel to an analog channel.

Figure 5:
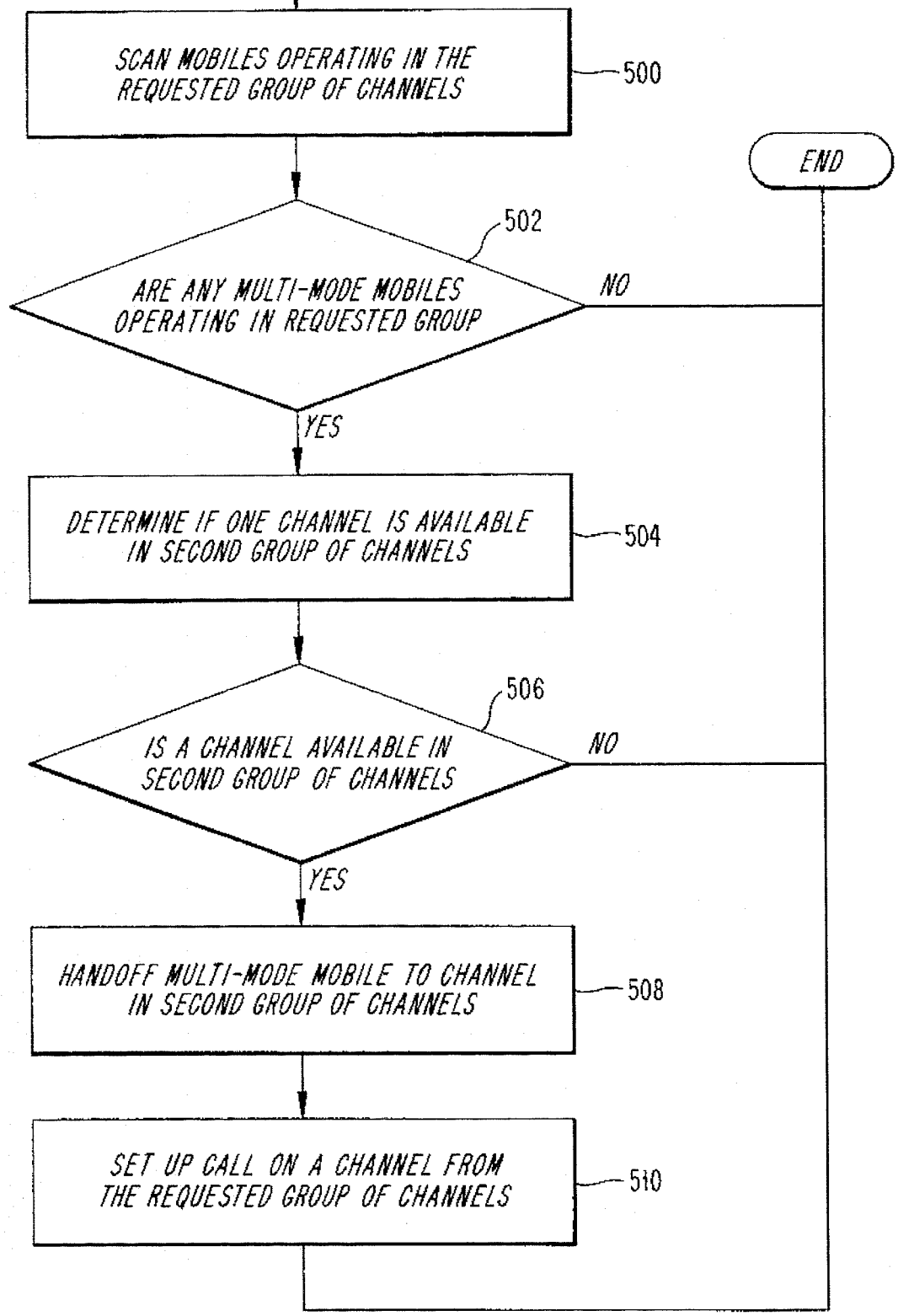

Referring to FIG. 5, there is shown a flow diagram illustrating the steps executed by the system after it is determined in step 301 that there is not an available channel in the group of channels used by the single mode mobile station. The system first scans the mobile stations in the group of used channels in step 500 to determine if there are any multi-mode mobile stations presently operating in the used group of channels. If the system determines in step 502 that a multi-mode mobile station is not operating in the used group of channels then no further action is taken. However, if the system determines that a multi-mode mobile station is presently operating in the used group of channels, the system determines whether a channel is available in the second group of channels in step 504. If it is determined in step 506 that a channel is not available, no further action is taken. However, if it is determined that a channel is available, the multi-mode mobile station is handed off to the available channel in the second group of channels in step 508. The system then sets up the call of the single mode mobile station on a channel from the group of channels in which the mobile station operates in step 510.

While the invention has been described in its preferred embodiments, it is to be understood that the words that have been used are words of description rather than of limitation and the changes within the purview of the appended claims may be made without departing from the true scope and spirit of the invention in its broader aspects.

We claim:

1. In a cellular communication system which contains two groups of channels and at least one of a first type of mobile station which uses only a first group of channels and at least one of a second type of mobile station which uses both first and second groups of channels, a method for allocating traffic channels to a mobile station of said first type, comprising the steps of:

determining whether a handoff of a mobile station of said second type is desired;

detecting whether any mobile station of said second type is operating in said first group of channels;

determining the available capacity in a said second group of channels; and handing-off a mobile station of said second type operating in said first group of channels to a channel in said second group of channels when a channel is available in said second group of channels.

2. A method for allocating traffic channels in a cellular communication system according to claim 1, wherein the detected mobile station is handed off to a channel in said second group of channels within a same base station.

3. A method for allocating traffic channels in a cellular communication system according to claim 1, wherein said step of determining whether a handoff of a mobile station of said second type is desirable is performed when a request for a channel assignment of a mobile station of said first type has been received and the number of available channels in said first group of channels is zero.

4. A method for allocating traffic channels in a cellular communication system according to claim 1, wherein said step of determining whether a handoff of a mobile station of said second type is desirable is performed when the number of available channels in said first groups of channels is below a threshold value.

5. A method for allocating traffic channels in a cellular communication system according to claim 4, wherein said threshold value is three available channels.

6. A method for allocating traffic channels in a cellular communication system according to claim 1, wherein said first group of channels are analog channels and said second group of channels are digital channels.

7. A method for allocating traffic channels in a cellular communication system according to claim 1, wherein said first group of channels are channels in a primary frequency band and said second group of channels are channels in an extended frequency band.

8. A method for allocating traffic channels in a cellular communication system according to claim 1, wherein said first group of channels are channels in a TDMA system and said second group of channels are channels in a CDMA system.

9. A method for allocating traffic channels in a cellular communication system according to claim 1, wherein the detected mobile station is handed off to a channel in said second group of channels with the least amount of interference.

10. A method for allocating traffic channels in a cellular communication system according to claim 1, wherein the detected mobile station is handed off to a randomly selected channel in said second group of channels.

* * * * *